(12) United States Patent
Lelio et al.

(10) Patent No.: US 9,044,909 B2
(45) Date of Patent: Jun. 2, 2015

(54) TYRE RETREADING METHOD AND SYSTEM

(75) Inventors: Luca Lelio, Rome (IT); Simone Neroni, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 1755 days.

(21) Appl. No.: 12/309,025

(22) PCT Filed: Jul. 6, 2007

(86) PCT No.: PCT/EP2007/056916
§ 371 (c)(1),
(2), (4) Date: Jun. 23, 2009

(87) PCT Pub. No.: WO2008/003786
PCT Pub. Date: Jan. 10, 2008

(65) Prior Publication Data
US 2009/0320988 A1 Dec. 31, 2009

(30) Foreign Application Priority Data
Jul. 6, 2006 (IT) .............. TO2006A0499

(51) Int. Cl.
*B29D 30/54* (2006.01)
*B29D 30/30* (2006.01)
*B29D 30/58* (2006.01)
*B29D 30/56* (2006.01)

(52) U.S. Cl.
CPC ............ *B29D 30/3007* (2013.01); *B29D 30/56* (2013.01); *B29D 30/54* (2013.01); *B29D 2030/544* (2013.01); *B29D 30/58* (2013.01)

(58) Field of Classification Search
CPC ... B29D 30/54; B29D 30/56; B29D 2030/544
USPC ............ 156/95, 96, 98, 127, 128, 130, 130.5, 156/405.1, 421.6, 13; 157/13
See application file for complete search history.

(56) References Cited

U.S. PATENT DOCUMENTS

| | | | | |
|---|---|---|---|---|
| 4,096,008 A | * | 6/1978 | Taylor | 156/96 |
| 4,149,926 A | * | 4/1979 | Taylor | 156/406.4 |
| 4,407,220 A | * | 10/1983 | Fesmire | 118/64 |
| 5,277,727 A | | 1/1994 | Seiler et al. | |
| 5,568,822 A | * | 10/1996 | Michelson | 134/64 P |
| 5,635,015 A | * | 6/1997 | Longo et al. | 156/380.9 |
| 5,755,904 A | | 5/1998 | Longo et al. | |
| 6,328,836 B1 | * | 12/2001 | Ogawa | 156/117 |
| 6,368,439 B1 | | 4/2002 | Bender et al. | |
| 6,758,931 B1 | * | 7/2004 | Daugherty et al. | 156/128.1 |

(Continued)

FOREIGN PATENT DOCUMENTS

DE 102 28 372 A1 6/2003
EP 0 054 533 A2 6/1982

(Continued)

*Primary Examiner* — Martin Rogers
(74) *Attorney, Agent, or Firm* — Oliff PLC

(57) ABSTRACT

A method and system (1) for retreading a tire (2), whereby the worn tread is removed from the tire (2); a green-rubber cushion (8) is wound about a carcass (6) of the tire (2); a tread strip (9) is wound about the carcass (6) and on top of the green-rubber cushion (8); and the carcass (6), complete with the green-rubber cushion (8) and the tread strip (9), is cured; prior to winding the green-rubber cushion (8) about the carcass (6), the lateral surface (7) of the carcass (6) is heated.

6 Claims, 2 Drawing Sheets

(56) References Cited

U.S. PATENT DOCUMENTS 6,998,006 B1 * 2/2006 Kessler et al. ............... 156/230
2005/0034804 A1 2/2005 Usami et al.

FOREIGN PATENT DOCUMENTS

EP 0 730 950 A2 9/1996
EP 1 120 235 A2 8/2001

* cited by examiner

TYRE RETREADING METHOD AND SYSTEM

TECHNICAL FIELD

The present invention relates to a tyre retreading method and system.

The present invention may be used to advantage in retreading truck tyres, to which the following description refers purely by way of example.

BACKGROUND ART

Cold-retreading of a truck tyre normally comprises removing the worn tread from the tyre, and applying a new tread to the tyre carcass. To apply a new tread to a carcass, a green-rubber intermediate strip or cushion and a pre-cured tread (PCT) strip are wound about the carcass; and the carcass is then inserted inside an autoclave and cured further to achieve optimum adhesion of the tread to the carcass by means of the bonding action of the cushion.

One example of a pre-cured tread strip ready for application to a tyre carcass is described in U.S. Pat. No. 5,277,727A1. And one example of a station for retreading a tyre using the above method is described in U.S. Pat. No. 6,368,439B1.

Before the green-rubber cushion is applied, the lateral surface of the carcass is sprayed with a liquid (so-called cement) with a green-rubber and normalheptane (or other organic solvent) base to assist adhesion of the green-rubber cushion to the carcass for retreading.

Applying cement, however, involves numerous drawbacks, in that, the cement being volatile and potentially highly pollutant, application calls for the use of a high-cost, bulky, insulated cementing booth (normally insulated with rock wool, which must be disposed of using appropriate, high-cost disposal methods); the cement is stored in drums, which must also be disposed of using appropriate, high-cost disposal methods; the presence of cement between the cushion and tread strip, i.e. of a heterogeneous material interposed between two layers of rubber, may impair performance of the retreaded tyre; and, finally, organic solvents such as those contained in the cement being highly pollutant, avoiding application of organic-solvent-based cement greatly reduces overall pollution of the tyre retreading process. In this connection, it is important to note that recent United Europe regulations (VOC 13/1999/EC) call for a 75% reduction in the use of organic solvents in industry by the year 2007.

U.S. Pat. No. 5,635,015A1 describes a tyre retreading method whereby, to avoid using cement, the green-rubber cushion is heated, before being wound onto the carcass, to improve adhesion of the green-rubber cushion, so cement is superfluous. Heating the green-rubber cushion, however, has been found to also soften it, thus making it more difficult to wind about the carcass.

DISCLOSURE OF THE INVENTION

It is an object of the present invention to provide a tyre retreading method and system designed to eliminate the aforementioned drawbacks, and which, in particular, are cheap and easy to implement.

According to the present invention, there are provided a tyre retreading method and system as claimed in the accompanying Claims.

BRIEF DESCRIPTION OF THE DRAWINGS

A non-limiting embodiment of the present invention will be described by way of example with reference to the accompanying drawings, in which.

PREFERRED EMBODIMENTS OF THE INVENTION

Figure 1:
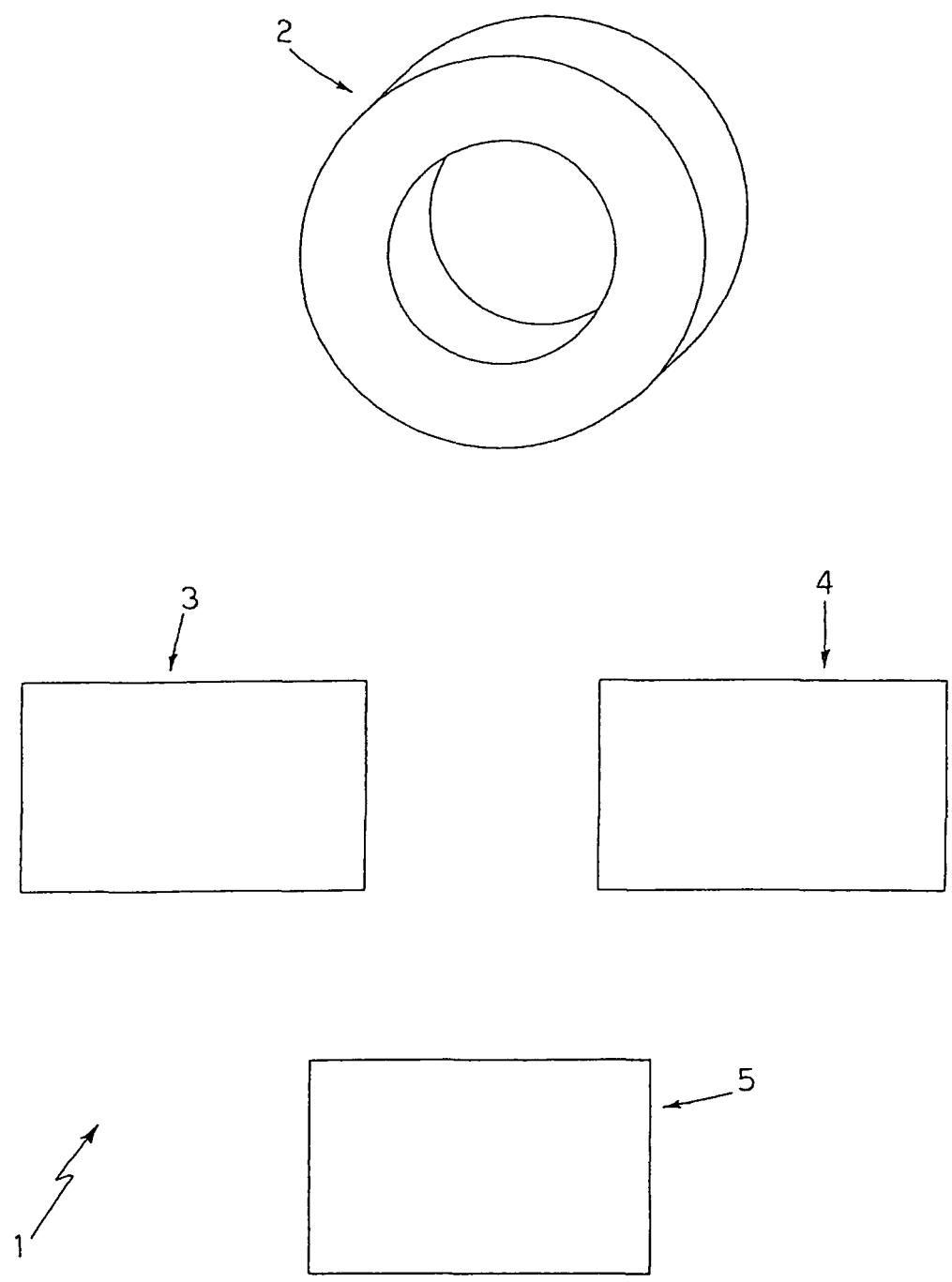
FIG. 1 shows a schematic of a tyre retreading system in accordance with the present invention.

Number 1 in FIG. 1 indicates as a whole a retreading system for retreading a truck tyre 2. Retreading system 1 comprises a preparation station 3, a winding station 4, and a curing station 5.

At preparation station 3, the worn tread (not shown) is removed from tyre 2, and the lateral surface 7 (shown in FIG. 2 and normally slightly toroidal in shape) of carcass 6 of tyre 2 is buffed to eliminate traces of the old tread (without damaging the underlying belts) and increase the specific surface area and so improve adhesion. The buffed lateral surface 7 of carcass 6 is then skived manually to remove any existing local damage, and, finally, is filled manually to fill any holes in lateral surface 7 of carcass 6 with green rubber.

The filled carcass 6 is then transferred to winding station 4, where an intermediate strip or cushion 8 of green rubber and a tread strip 9 are wound about carcass 6.

Figure 2:
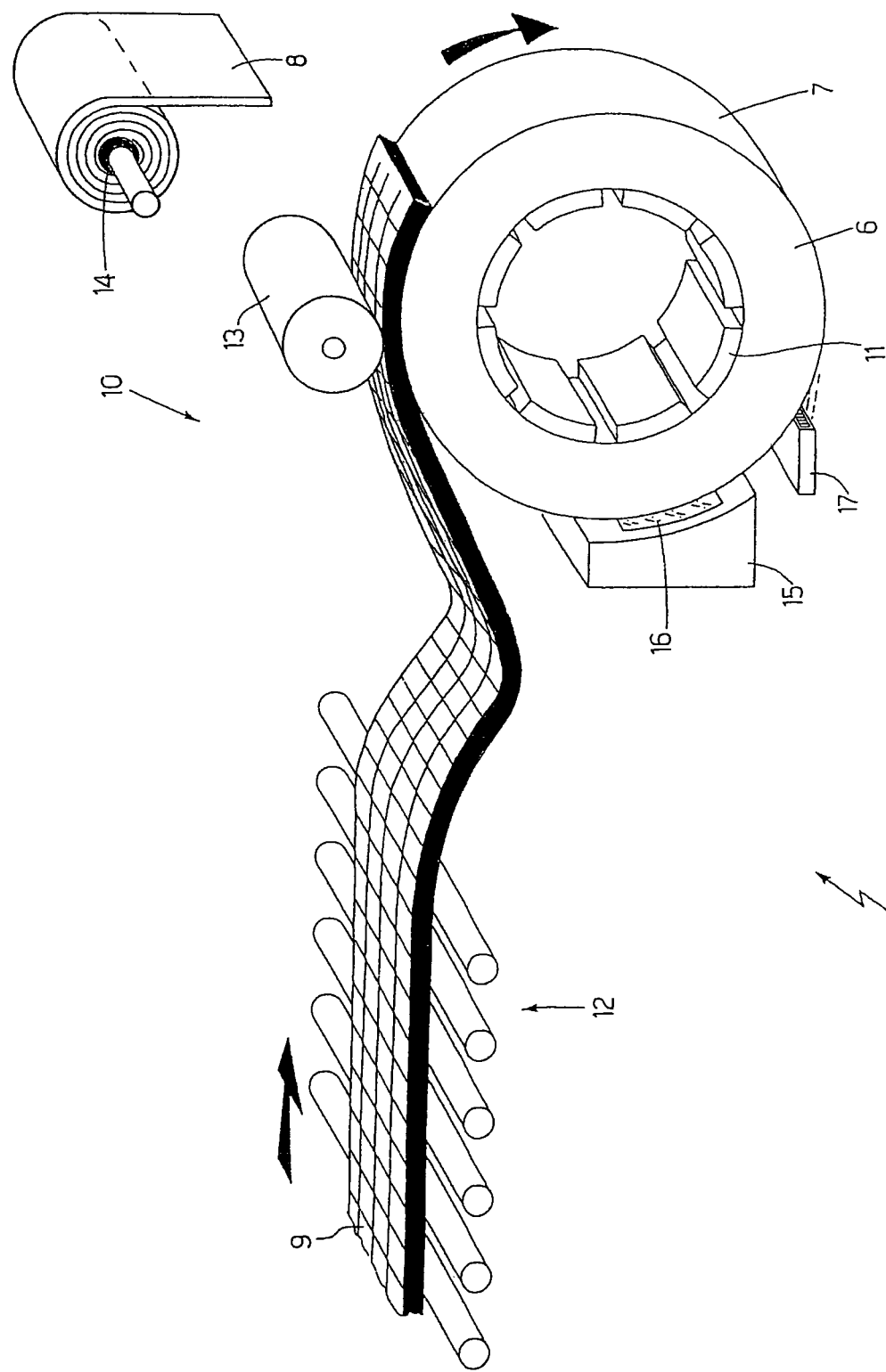
FIG. 2 shows a building machine of the FIG. 1 retreading system.

As shown in FIG. 2, winding station 4 comprises a building machine 10, in turn comprising a rotary drum 11 supporting carcass 6; a feed conveyor 12 for feeding tread strip 9 to rotary drum 11; a pressure roller 13 positioned on tread strip 9 between drum 11 and feed conveyor 12; and an actuating device (not shown) for pushing pressure roller 13 on tread strip 9 with adjustable force. Building machine 10 may also comprise a support 14 for supporting in rotary manner a roll of green-rubber cushion 8, which is wound manually about carcass 6. In other words, feed conveyor 12 and support 14 define winding means for winding green-rubber cushion 8 about carcass 6, and for winding tread strip 9 about carcass 6 and on top of green-rubber cushion 8.

Building machine 10 also comprises a heating device 15 located close to drum 11, upstream from feed conveyor 12 (as shown in FIG. 2) or downstream from feed conveyor 12 in the rotation direction of drum 11. Heating device 15 comprises at least one infrared lamp 16 for heating by radiation the lateral surface 7 of carcass 6 on drum 11.

In a preferred embodiment, building machine 10 comprises a blower 17 located close to drum 11, upstream from heating device 15 in the rotation direction of drum 11. Prior to heating, blower 17 blows a jet of compressed air in a substantially tangential direction onto lateral surface 7 of carcass 6 or onto the outer surface of green-rubber cushion 8, substantially for the purpose of further cleaning, and particularly removing dust from, lateral surface 7 of carcass 6 or the outer surface of green-rubber cushion 8. In one possible embodiment, the compressed air from blower 17 may be heated by electric resistors to assist heating.

In actual use, carcass 6 is mounted on drum 11, and green-rubber cushion 8 and tread strip 9 are wound about carcass 6 by rotating drum 11; and heating device 15 and blower 17 are activated as drum 11 rotates.

In a preferred embodiment, building machine 10 is used to manually wind green-rubber cushion 8 about carcass 6 separately from tread strip 9, and is then used to wind tread strip 9 about carcass 6 and on top of the previously wound green-rubber cushion 8. In which case, heating device 15 and blower 17 act on both lateral surface 7 of carcass 6 as green-rubber cushion 8 is wound on, and on the outer surface of green-rubber cushion 8 as tread strip 9 is wound on.

In an alternative embodiment, green-rubber cushion 8 is superimposed on tread strip 9, off building machine 10, by means of a pair of known mutually cooperating pressure rollers (not shown), and green-rubber cushion 8 and tread strip 9 are then wound together about carcass 6 on building machine 10. In which case, heating device 15 and blower 17 only act on lateral surface 7 of carcass 6 as green-rubber cushion 8 and tread strip 9 are wound on together.

Lateral surface 7 of carcass 6 and/or the outer surface of green-rubber cushion 8 are/is preferably heated to a temperature ranging between 50° C. and 75° C. It is important to note that below 50° C. fails to provide for sufficiently strong adhesion, and over 75° C. may result in partial, irregular surface curing of green-rubber cushion 8, which impairs not only the success of the retreading process, but also performance of the retreaded tyre 2.

It is important to note that green-rubber cushion 8 may be calendered or extruded. If extruded directly on building machine 10, green-rubber cushion 8 has a temperature of about 75-80° C. as a result of the extrusion process, so lateral surface 7 of carcass 6 may not need heating, or may be heated to a relatively low temperature, when winding on the extruded green-rubber cushion 8.

Once green-rubber cushion 8 and tread strip 9 are wound about carcass 6, tyre 2 is transferred to curing station 5 (shown schematically in FIG. 1) where tyre 2 is cured. The curing process may be a cold curing process, in which tyre 2 is cured for a short time in an autoclave, or a hot curing process, in which tyre 2 is cured for a prolonged length of time inside a curing mold on a press. When using a pre-cured tread (PCT) strip, only green-rubber cushion 8 needs curing to achieve optimum adhesion of tread strip 9 to carcass 6 by means of the bonding action of cushion 8, so the cold curing process is adopted. Conversely, when using a green-rubber tread strip 9, both cushion 8 and tread strip 9 must be cured, so the hot curing process is adopted.

The retreading method described above eliminates cementing of the lateral surface 7 of carcass 6, while still achieving optimum adhesion of green-rubber cushion 8 to carcass 6. Heating lateral surface 7 of carcass 6, before winding on green-rubber cushion 8, in fact, improves adhesion of carcass 6 to green-rubber cushion 8. It should be stressed that only lateral surface 7 of carcass 6, and not green-rubber cushion 8, is heated, thus preventing green-rubber cushion 8 from softening and so being difficult to wind about carcass 6.

As stated, eliminating cementing of lateral surface 7 of carcass 6 greatly reduces both the cost and pollution of the retreading process.

The invention claimed is:

1. A method of retreading a tyre; the method comprising the steps of:
    removing the worn tread from the tyre;
    winding a green-rubber cushion about a carcass of the tyre while the tyre is supported by a drum;
    winding a tread strip about the carcass and on top of the green-rubber cushion;
    curing the carcass complete with the green-rubber cushion and the tread strip;
    heating a radially outermost, crown surface of the carcass, before the green-rubber cushion is wound about the carcass, by means of a heating device located close to the drum; and
    blowing, in a direction substantially tangent to the crown surface, a jet of heated compressed air onto the crown surface of the carcass to pre-heat the crown surface of the carcass before heating the crown surface of the carcass by means of the heating device.

2. A method as claimed in claim 1, wherein the green-rubber cushion is wound about the carcass before the tread strip and independently of the tread strip.

3. A method as claimed in claim 2, and comprising the further step of heating an outer surface of the green-rubber cushion, wound about the carcass, before winding the tread strip about the carcass and on top of the green-rubber cushion.

4. A method as claimed in claim 1, wherein the crown surface of the carcass is heated using at least one infrared lamp located close to the carcass.

5. A method as claimed in claim 1, wherein the crown surface of the carcass is heated to a temperature ranging between 50° C. and 75° C.

6. A method as claimed in claim 1, and comprising, prior to winding the green-rubber cushion about the carcass, the further steps of:
    buffing the crown surface of the carcass;
    skiving the crown surface of the carcass; and
    filling any holes in the crown surface of the carcass with green rubber.

* * * * *